United States Patent
Asakura et al.

(10) Patent No.: US 10,186,916 B2
(45) Date of Patent: Jan. 22, 2019

(54) ROTARY MACHINE AND ELECTRIC VEHICLE

(71) Applicant: TOP CO., LTD., Echizen-Shi, Fukui (JP)

(72) Inventors: Hiroaki Asakura, Echizen (JP); Nobuyuki Tanaka, Echizen (JP); Tadashi Uno, Fukui (JP); Shingo Yamada, Fukui (JP)

(73) Assignee: TOP CO., LTD, Echizen-Shi, Fukui (JP)

( * ) Notice: Subject to any disclaimer, the term of this patent is extended or adjusted under 35 U.S.C. 154(b) by 686 days.

(21) Appl. No.: 14/655,867

(22) PCT Filed: Dec. 13, 2013

(86) PCT No.: PCT/JP2013/083517
§ 371 (c)(1),
(2) Date: Jun. 26, 2015

(87) PCT Pub. No.: WO2014/103757
PCT Pub. Date: Jul. 3, 2014

(65) Prior Publication Data
US 2015/0340914 A1 Nov. 26, 2015

(30) Foreign Application Priority Data
Dec. 28, 2012 (JP) .................. 2012-288471

(51) Int. Cl.
*H02K 1/04* (2006.01)
*H02K 1/16* (2006.01)
(Continued)

(52) U.S. Cl.
CPC .............. *H02K 1/165* (2013.01); *H02K 1/04* (2013.01); *H02K 1/148* (2013.01); *H02K 21/16* (2013.01);
(Continued)

(58) Field of Classification Search
CPC ........ H02K 1/146; H02K 15/10–15/15; H02K 1/04
See application file for complete search history.

(56) References Cited

U.S. PATENT DOCUMENTS 4,352,897 A 10/1982 Ogata et al.
6,583,531 B1 6/2003 Asano et al.

FOREIGN PATENT DOCUMENTS

DE 102010041244 A1 3/2012
EP 1746704 A2 1/2007
(Continued)

OTHER PUBLICATIONS

Japanese Office Action dated Nov. 24, 2015 issued in corresponding Japanese Patent Application No. 2014-554320.
(Continued)

*Primary Examiner* — Ramon M Barrera
(74) *Attorney, Agent, or Firm* — Troutman Sanders LLP

(57) ABSTRACT

The rotary machine includes a rotor rotatably provided and a resin-molded stator. The stator includes a stator core, a coil, and a mold portion. A tooth portion in the stator core includes first and second facing portions. The first facing portion includes a first facing surface where an air gap with the rotor becomes a first distance. The second facing portion is integrated with the first facing portion in the circumferential direction centered at the rotation axis of the rotor, and includes a second facing surface where the air gap becomes a second distance wider than the first distance. The second facing portion includes a groove portion on the second facing surface. The mold portion includes a first mold portion. The first mold portion covers the second facing portion, is provided at the groove portion, and includes a third facing surface where the air gap becomes the first distance.

17 Claims, 12 Drawing Sheets

(51) Int. Cl.
  *H02K 21/16* (2006.01)
  *H02K 1/14* (2006.01)
  *H02K 15/12* (2006.01)
(52) U.S. Cl.
  CPC ....... *B60L 2220/12* (2013.01); *B60L 2220/50* (2013.01); *H02K 15/12* (2013.01); *H02K 2201/03* (2013.01); *Y02T 10/641* (2013.01)

(56) References Cited

FOREIGN PATENT DOCUMENTS

| | | | |
|---|---|---|---|
| JP | S59123450 A | 7/1984 | |
| JP | H 10-126981 A | 5/1998 | |
| JP | 2000209792 A | 7/2000 | |
| JP | 2000-333423 A | 11/2000 | |
| JP | 2004-274963 A | 9/2004 | |
| JP | 2007-185038 A | 7/2007 | |
| JP | 2010178520 A | 8/2010 | |
| JP | 2012-244744 A | 12/2012 | |
| WO | 2011/101986 A1 | 8/2011 | |

OTHER PUBLICATIONS

Office Action dated Jun. 8, 2017 issued during the prosecution of corresponding European Patent Application No. 13868443.6.
Extended European Search Report dated Jun. 29, 2016 issued in corresponding EP Patent Application No. 13868443.6.

ROTARY MACHINE AND ELECTRIC VEHICLE

TECHNICAL FIELD

The present invention relates to a rotary machine including a resin-molded stator, such as a motor or an electric generator, and to an electric vehicle including the rotary machine.

BACKGROUND ART

A technique related to a motor as a rotary machine has been proposed. For example, a permanent magnet motor is disclosed in Patent Literature 1. In this permanent magnet motor, an air gap of a rotation backward side portion of a portion facing a rotor surface of a tooth portion is larger than air gaps of other portions.

A method for manufacturing a molded motor is disclosed in Patent Literature 2. In this manufacturing method, wire is wound around a stator iron core including a ring-shaped yoke and a plurality of teeth that is arranged on the inner peripheral portion of the yoke, and the outer shell of the motor is formed by resin-integrated molding. This manufacturing method is characterized in that a clearance between the inner diameter of the stator iron core and the lower die inner core of the molding die is reduced to the minimum. Patent Literature 2 describes that the occurrence of thin-walled burr of resin in the inner diameter of the stator finished product formed by resin-integrated molding cannot be prevented and, in many cases, it is required to perform a process for removing a resin burr by additional work such as wire buffing or inner-diameter cutting in a post-process, and that, if this resin burr is not removed, the resin burr drops off during motor operation and becomes a factor to cause a motor sound failure.

CITATION LIST

Patent Literature

PATENT LITERATURE1: JP-A-2000-333423
PATENT LITERATURE2: JP-A-2007-185038

SUMMARY OF INVENTION

Problems to be Solved by the Invention

A rotary machine is also mounted on an electric vehicle or the like other than electrical products for home use or for industrial use. As the rotary machine, a motor or an electric generator is provided. In the rotary machine provided in various products including an electric vehicle, in the case of the configuration where a stator is resin-molded, an inner core is provided in a molding die for resin molding to prevent resin from entering the inner peripheral portion of the stator. Resin molding is performed in a state where the inner core is inserted into the inner peripheral portion of the stator. In the stator where an end portion at one side or at both sides of a tooth portion in the circumferential direction corresponding to the rotation direction of the rotor has a shape where an air gap with the rotor is widened, when the inner core in the molding die has a true circle shape, a clearance corresponding to an increase of the air gap is generated between the respective portions described previously and the outer peripheral side surface of the inner core facing these respective portions. Accordingly, resin enters the clearance described previously at the time of resin molding. However, in the case where the increased amount of the air gap is small, in the stator after resin molding, an unstable thin-walled covering portion (resin layer) may be formed on the respective portions described previously.

To inhibit the formation of such a thin-walled covering portion, it is also possible to take a countermeasure of making the shape of the inner core correspond to the shape of the inner peripheral side surface of the stator. However, as described above, in many cases, the increased amount of the air gap at the end portion of the tooth portion in the circumferential direction is small. Additionally, one stator includes a plurality of tooth portions. Accordingly, the countermeasure of making the shape of the inner core correspond to the shape of the inner peripheral side surface of the stator is not always considered as a preferable countermeasure. For example, the shape of the inner core becomes complicated and, as a result, the manufacture or management of the inner core becomes difficult. Such an inner core may increase the manufacturing cost. Incidentally, the above description is based on a rotary machine of an inner rotation type, but the same problem may also occur in a rotary machine of an outer rotation type.

A rotary machine that includes a resin-molded stator is mounted on various products as described above. In various products, the structure for mounting the rotary machine may be required to be simple.

An object of the present invention is to provide a rotary machine that can inhibit resin from dropping off in a resin-molded stator, and an electric vehicle that includes the rotary machine.

Solutions to the Problems

An aspect of the present invention is a rotary machine including a rotor rotatably provided and a resin-molded stator, wherein the stator includes: a stator core formed by laminating steel sheets, the stator core including a plurality of tooth portions facing the rotor and a yoke portion; a coil housed in a slot portion formed between the adjacent tooth portions; and a mold portion formed by resin molding, the tooth portion includes: a first facing portion that includes a first facing surface where an air gap with the rotor becomes a first distance; and a second facing portion integrated with the first facing portion in a circumferential direction centered at a rotation axis of the rotor, the second facing portion including a second facing surface where the air gap becomes a second distance wider than the first distance, the second facing portion includes, on the second facing surface, a groove portion extending in a lamination direction where the steel sheets are laminated, the mold portion includes a first mold portion that covers the second facing portion and is provided at the groove portion, and the first mold portion includes a third facing surface where the air gap becomes the first distance.

According to this rotary machine, the resin forming the first mold portion enters the groove portion to increase the thickness of the first mold portion, which covers the second facing portion, in the radial direction centered at the rotation axis of the rotor, and it is possible to improve its strength. In the rotary machine, it is possible to inhibit the resin forming the first mold portion from dropping off. It is possible to improve the reliability of the rotary machine. The "rotary machine" is a concept including a motor or an electric generator. The "circumferential direction" is a direction centered at the rotation axis of the rotor, and is a concept including both directions of the rotation direction and the direction opposite thereto. The "second distance" only needs to be a distance wider than the first distance, and is a concept including the case of a distance that changes in a predetermined range, other than the case of a constant distance.

This rotary machine may be configured as follows. The first mold portion may be engaged with the groove portion.

According to this, the first mold portion is supported by the groove portion, and it is possible to inhibit the resin forming the first mold portion from dropping off. The "engagement" is a mutually related state, and is broadly interpreted. For example, a contact state and/or a stuck state are/is included.

The mold portion may include: a second mold portion provided at a side of a first end surface of the stator core in the lamination direction, the second mold portion covering a first coil end portion of the coil at the side of the first end surface; and a third mold portion provided at a side of a second end surface of the stator core in the lamination direction, the third mold portion covering a second coil end portion of the coil at the side of the second end surface, and the first mold portion may be integrated with the second mold portion and the third mold portion.

According to this, the first mold portion is supported by the second mold portion and the third mold portion, and it is possible to inhibit the resin forming the first mold portion from dropping off.

The mold portion may include a fourth mold portion that includes a first planar surface parallel to a second end surface of the stator core in the lamination direction, and the first planar surface may be provided at a side of a first end surface of the stator core in the lamination direction.

According to this, it is possible to provide the first planar surface parallel to the second end surface at a position separated from the second end surface of the stator core as a reference by a predetermined amount in the lamination direction. In the stator core having the structure where the steel sheets are laminated, variation may arise in the dimension (thickness of the stator core) in the lamination direction. Mounting of the rotary machine on a predetermined product may be performed by, for example, clamping of the stator core. For example, in the case where the product with such a structure is manufactured in large quantities, it is desired that the clamped portion in each rotary machine has a constant dimension. In the case where the thickness of the stator core is not constant, it is necessary to have a structure for clamping to deal with the variation in thickness. It is possible to provide the first planar surface with reference to the second end surface by the fourth mold portion, so that the rotary machine can be mounted on the predetermined product via the first planar surface and the second end surface. Accordingly, it is possible to simplify the structure for clamping in the product that includes the rotary machine. Mounting of the rotary machine on the predetermined product is performed by, for example, clamping of the first planar surface and the second end surface.

The fourth mold portion may include a second planar surface parallel to the second end surface, the second planar surface being separated from the first planar surface by a predetermined amount in the lamination direction, and the second planar surface may be provided at a side of the second end surface in the lamination direction.

According to this, it is possible to mount the rotary machine on a predetermined product via the first planar surface and the second planar surface that are parallel to each other and separated from each other by a predetermined amount in the lamination direction. Mounting of the rotary machine on the predetermined product is performed by, for example, clamping of the first planar surface and the second planar surface.

The mold portion may include: a second mold portion provided at a side of the first end surface in the lamination direction, the second mold portion covering a first coil end portion of the coil at the side of the first end surface; and a third mold portion provided at a side of the second end surface in the lamination direction, the third mold portion covering a second coil end portion of the coil at the side of the second end surface, and the fourth mold portion may be integrated with at least one of the second mold portion and the third mold portion.

According to this, the fourth mold portion is supported by the second mold portion and/or the third mold portion, and it is possible to inhibit the resin forming the fourth mold portion from dropping off.

The first mold portion may be integrated with the second mold portion and the third mold portion.

According to this, the first mold portion is supported by the second mold portion and the third mold portion, and it is possible to inhibit the resin forming the first mold portion from dropping off.

The stator core may include a cutout portion extending in the lamination direction on a peripheral side surface at a side where the tooth portion is not provided in a radial direction centered at the rotation axis, and the fourth mold portion may be provided at the cutout portion.

According to this, the fourth mold portion is supported by the cutout portion, and it is possible to inhibit the resin forming the fourth mold portion from dropping off. When the rotary machine is a so-called rotary machine of an inner rotation type where the rotor is rotatably provided at the inner side of the stator, "a peripheral side surface at a side where the tooth portion is not provided in a radial direction centered at the rotation axis" in the above description is the outer peripheral side surface (the side surface at the outer side in the radial direction) of the stator core (the yoke portion). When the rotary machine is a so-called rotary machine of an outer rotation type where the rotor is rotatably provided at the outer side of the stator, "a peripheral side surface at a side where the tooth portion is not provided in a radial direction centered at the rotation axis" in the above description is the inner peripheral side surface (the side surface at the inner side in the radial direction) of the stator core (the yoke portion).

Another aspect of the present invention is a rotary machine including a rotor rotatably provided and a resin-molded stator, wherein the stator includes: a stator core formed by laminating steel sheets, the stator core including a plurality of tooth portions facing the rotor and a yoke portion; a coil housed in a slot portion formed between the adjacent tooth portions; and a mold portion formed by resin molding, the mold portion includes a fourth mold portion that includes a first planar surface parallel to a second end surface of the stator core in a lamination direction where the steel sheets are laminated, and the first planar surface is provided at a side of a first end surface of the stator core in the lamination direction.

According to this rotary machine, it is possible to provide the first planar surface parallel to the second end surface at a position separated from the second end surface of the stator core as the reference by a predetermined amount in the lamination direction. Even if the variation arises in the thickness of the stator core as described above, it is possible to dispose the first planar surface with reference to the second end surface by the fourth mold portion, so that the rotary machine can be mounted on a predetermined product via the first planar surface and the second end surface. Accordingly, it is possible to simplify the structure for clamping in the product that includes the rotary machine. Mounting of the rotary machine on the predetermined product is performed by, for example, clamping of the first planar surface and the second end surface. The "rotary machine" is similar to that in the above description.

This rotary machine may be configured as follows. The fourth mold portion may include a second planar surface parallel to the second end surface, the second planar surface being separated from the first planar surface by a predetermined amount in the lamination direction, and the second planar surface may be provided at a side of the second end surface in the lamination direction.

According to this, it is possible to mount the rotary machine on a predetermined product via the first planar surface and the second planar surface that are parallel to each other and separated from each other by a predetermined amount in the lamination direction. Mounting of the rotary machine on the predetermined product is performed by, for example, clamping of the first planar surface and the second planar surface.

The mold portion may include: a second mold portion provided at a side of the first end surface in the lamination direction, the second mold portion covering a first coil end portion of the coil at the side of the first end surface; and a third mold portion provided at a side of the second end surface in the lamination direction, the third mold portion covering a second coil end portion of the coil at the side of the second end surface, and the fourth mold portion may be integrated with at least one of the second mold portion and the third mold portion.

According to this, the fourth mold portion is supported by the second mold portion and/or the third mold portion, and it is possible to inhibit the resin forming the fourth mold portion from dropping off.

The stator core may include a cutout portion extending in the lamination direction on a peripheral side surface at a side where the tooth portion is not provided in a radial direction centered at a rotation axis of the rotor, and the fourth mold portion may be provided at the cutout portion.

According to this, the fourth mold portion is supported by the cutout portion, and it is possible to inhibit the resin forming the fourth mold portion from dropping off. "A peripheral side surface at a side where the tooth portion is not provided in a radial direction centered at a rotation axis of the rotor" is similar to the case of "a peripheral side surface at a side where the tooth portion is not provided in a radial direction centered at the rotation axis" described above.

Still another aspect of the present invention is an electric vehicle that includes any of the above-described rotary machines. According to this electric vehicle, the above-described function provided by any of the above-described rotary machines is obtained. It is possible to improve the reliability of the electric vehicle.

Advantageous Effects of the Invention

According to the present invention, it is possible to obtain a rotary machine that can inhibit resin from dropping off in a resin-molded stator, and an electric vehicle that includes the rotary machine.

DESCRIPTION OF EMBODIMENTS

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Another configuration may be included.

<Rotary Machine>

Figure 1:
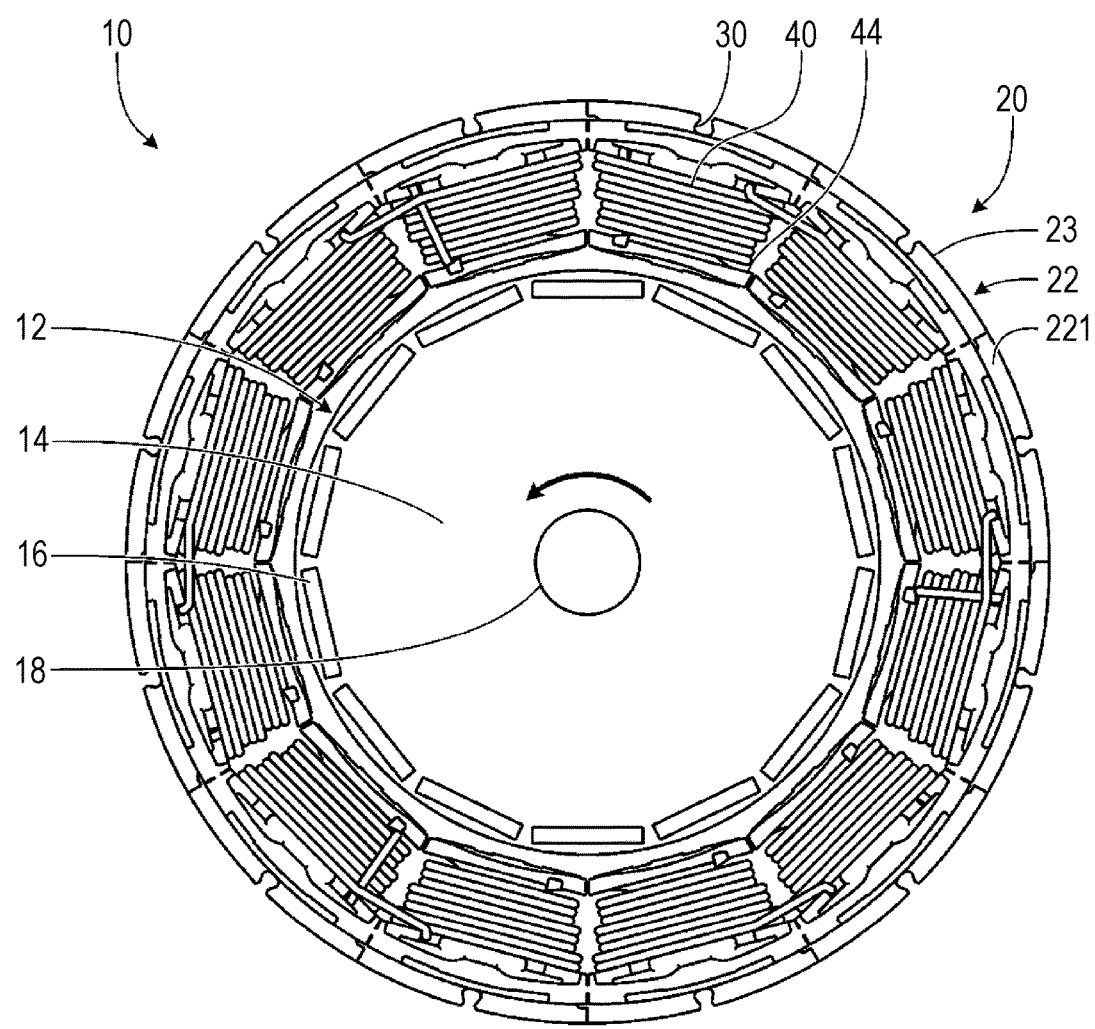
FIG. 1 is a plan view illustrating one example of a rotary machine.
Figure 2:
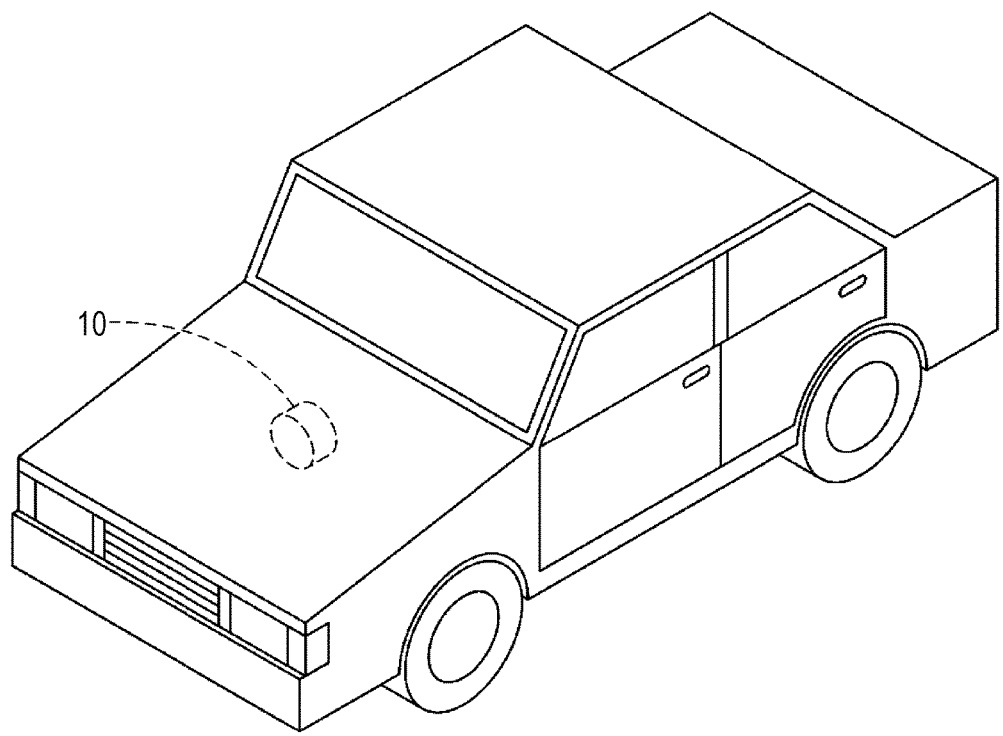
FIG. 2 is a perspective view illustrating one example of an electric car as an electric vehicle.

A rotary machine 10 is, for example, a motor or an electric generator. The rotary machine 10 includes a rotor 12 and a stator 20 as illustrated in FIG. 1. In the present embodiment, the case where the number of poles of the rotor 12 is 14 and the number of slots of the stator 20 is 12 will be described as an example (see FIG. 1). The rotary machine 10 is mounted on various products. For example, the rotary machine 10 is mounted on an electric vehicle. As the electric vehicle, an electric car (see FIG. 2), an electric bicycle, an electric wheelchair, an electric cart, or an electric food trolley is exemplified. The electric car includes a hybrid car. When the rotary machine 10 is a motor, the rotary machine 10 is used as, for example, a power source for moving an electric vehicle. In FIG. 2, the illustration of the rotary machine 10 mounted in the electric car is simplified.

The rotor 12 includes a rotor core 14, 14 permanent magnets 16, and a shaft 18. The rotor core 14 is formed by laminating electrical steel sheets, for example, while punching the electrical steel sheet with a press machine. The rotor core 14 is provided with spaces for housing each of the 14 permanent magnets 16 and a through-hole to which the shaft 18 is secured are formed. Such spaces and through-hole extend in the direction where the electrical steel sheets are laminated. For weight reduction or the like of the rotor 12, a predetermined hole portion may be provided to the rotor core 14. The permanent magnets 16 are provided inside the rotor core 14 in the state of being housed in the spaces described previously. When the rotary machine 10 is a motor, the motor that includes such a rotor 12 is called an Interior Permanent Magnet (IPM) motor.

The shaft 18 is secured to the through-hole formed at the center portion of the rotor core 14. Bearings (not illustrated) are attached to the shaft 18 at both sides of the rotor core 14. The bearings are supported by a supporting portion (not illustrated) provided at the stator 20. The shaft 18 serves as the rotation axis, and the rotor 12 rotates around the shaft 18 as the rotational center. The rotor 12 is similar to the rotor included in a motor or an electric generator that has already been put to practical use. Therefore, other descriptions related to the rotor 12 will be omitted. In the present embodiment, the direction where the rotor 12 rotates is referred to as "rotation direction," and the direction corresponding to the rotation direction is referred to as "circumferential direction." The "arrow" illustrated in the vicinity of the shaft 18 in FIG. 1 indicates the rotation direction. The circumferential direction is the concept that is centered at the shaft 18 serving as the rotation axis and includes both directions of the rotation direction and the direction opposite thereto. The radiation direction centered at the shaft 18 serving as the rotation axis in the rotary machine 10 is referred to as "radial direction."

Figure 3:
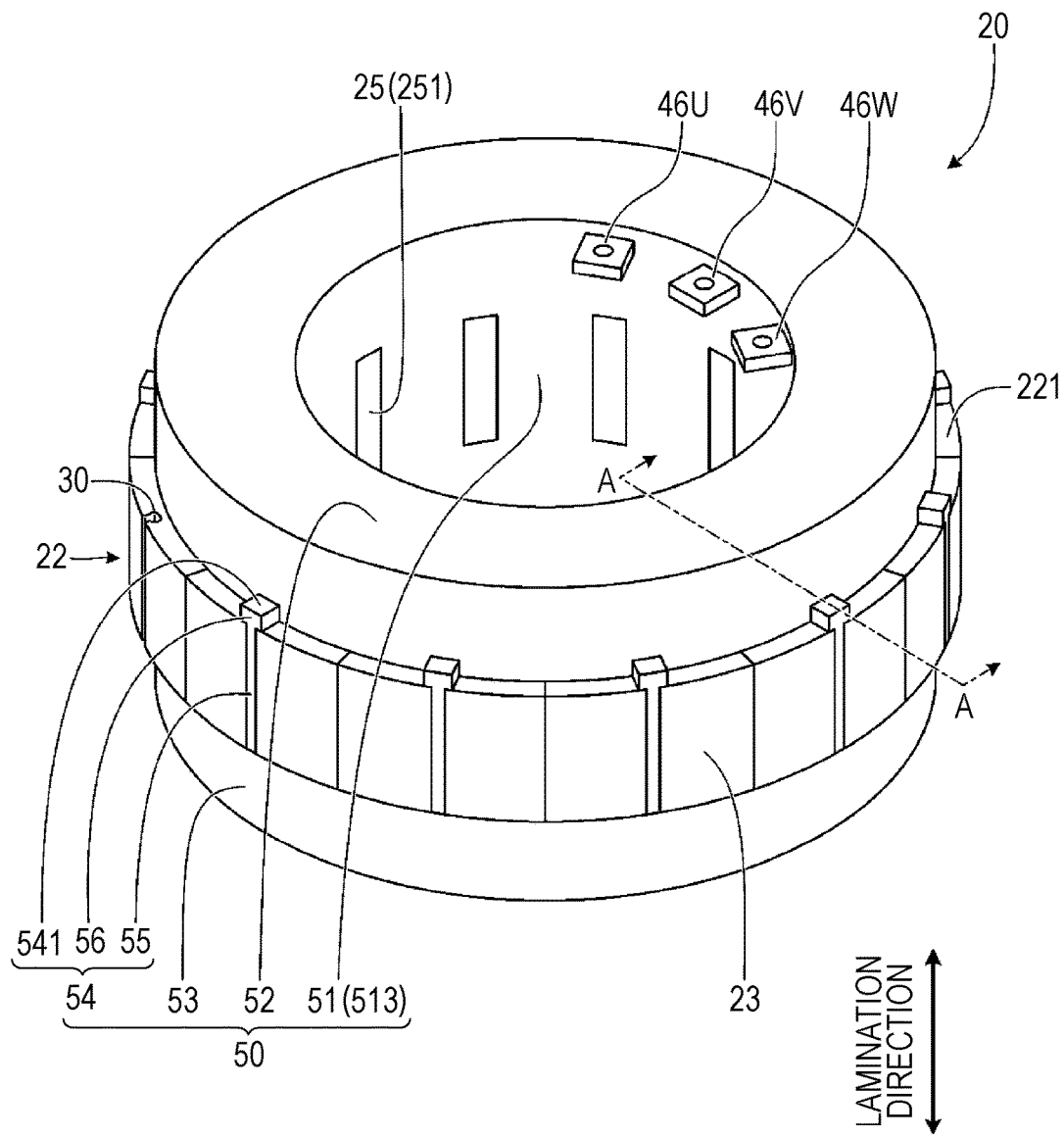
FIG. 3 is a perspective view illustrating one example of a resin-molded stator.
Figure 4:
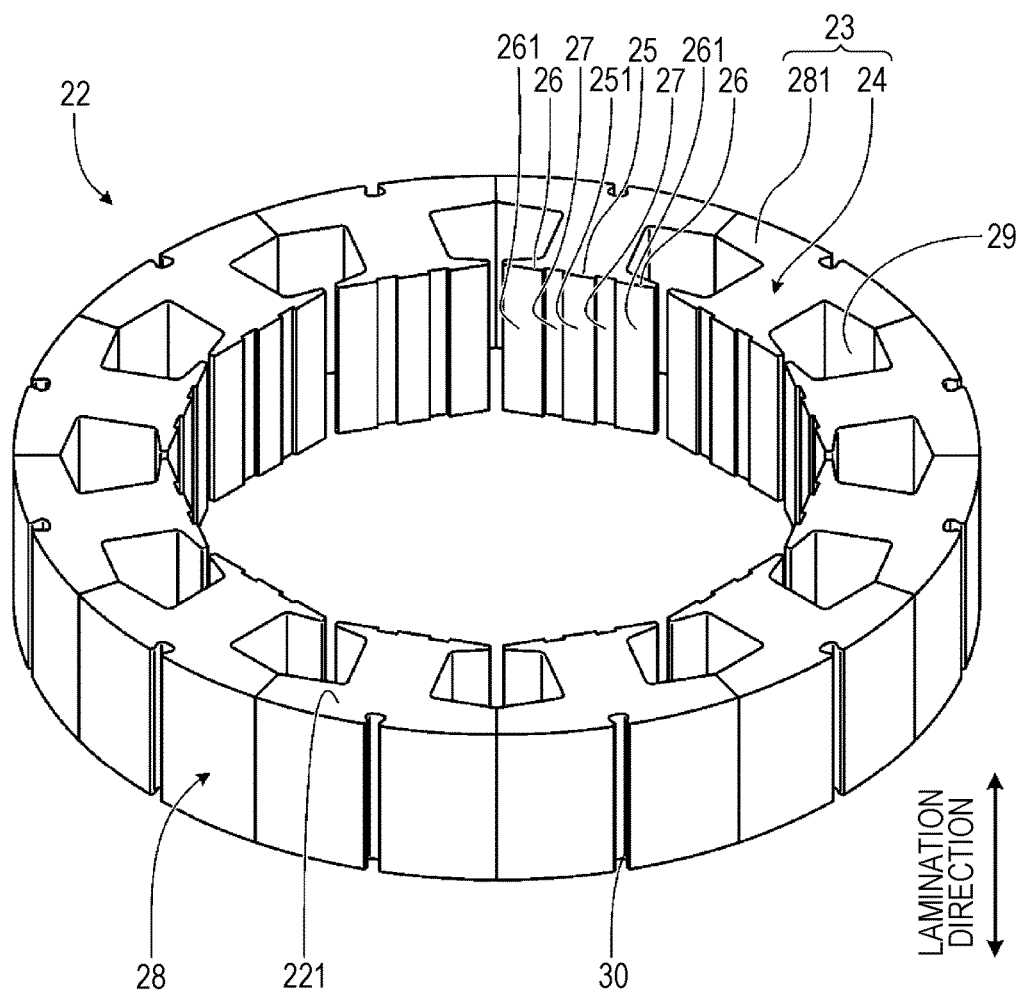
FIG. 4 is a perspective view illustrating one example of a stator core.

The stator 20 is resin-molded. As illustrated in FIGS. 1 and 3, the stator 20 includes a stator core 22, a coil 40, terminals 46U, 46V, and 46W, and a mold portion 50. In the state illustrated in FIG. 1, the illustration of the mold portion 50 is omitted, and a plurality of coils 40 whose wires are wound around a plurality of tooth portions 24 is illustrated. Additionally, in FIG. 1, the illustrations of the terminals 46U, 46V, and 46W are omitted. In FIG. 3, the illustration related to lamination of the laminated electrical steel sheets is omitted. Regarding omission of the illustration related to lamination of the electrical steel sheets, the same applies to FIGS. 4, 8, 12, and 13 described later. Incidentally, in FIGS. 7 and 9, laminated states are illustrated. The stator core 22 includes the plurality of tooth portions 24, a yoke portion 28, and a plurality of cutout portions 30 as illustrated in FIG. 4. In the present embodiment where the number of slots of the stator 20 is 12, the number of the tooth portions 24 is 12. The 12 tooth portions 24 project toward the side of the rotor 12 (the shaft 18) from the yoke portion 28. The direction in which the tooth portions 24 project coincides with the radial direction.

The stator core 22 is formed such that a plurality of stator core segments 23 is arranged in a ring shape as illustrated in FIG. 4. The stator core segment 23 is referred to as "segment 23." In the present embodiment, the number of the tooth portions 24 in one segment 23 is set to one, and thus the stator core 22 is formed such that 12 segments 23 are arranged in a ring shape.

Figure 5:
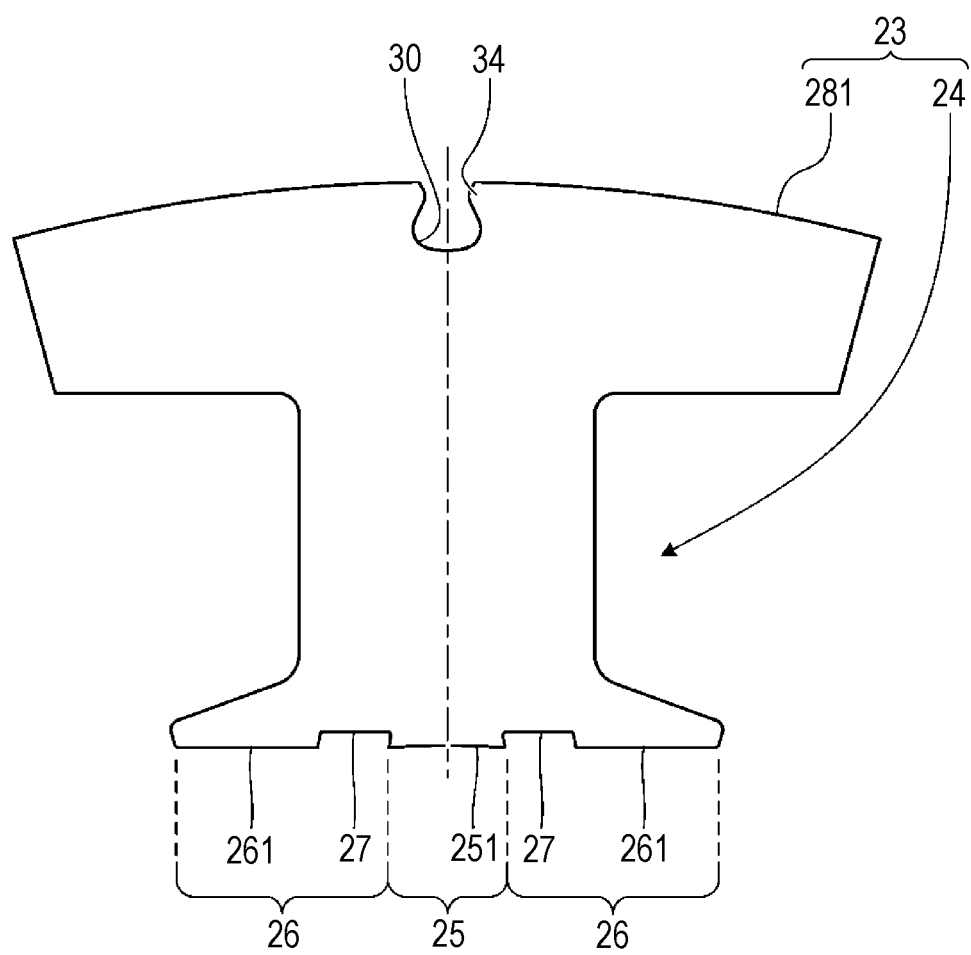
FIG. 5 is a plan view illustrating one example of a stator core segment.

As illustrated in FIGS. 4 and 5, the segment 23 is formed by the tooth portion 24 and a yoke part 281. The yoke part 281 is a portion that forms a part of the ring-shaped yoke portion 28. A slot 29 is formed between the two tooth portions 24 adjacent to each other in the state where the segments 23 are arranged in a ring shape. The segment 23 is formed by laminating electrical steel sheets, for example, while punching the electrical steel sheet into the shape illustrated in FIG. 5 with a press machine. The surface formed by laminating the fracture surfaces punched with the press machine is an irregular surface. This surface formed by laminating the fracture surfaces includes, for example, a first facing surface 251, a second facing surface 261 (including the inner surface of a groove portion 27), the outer peripheral side surface of the segment 23 (the yoke part 281), and the inner surface of the cutout portion 30 described later. In the present embodiment, the direction in which the electrical steel sheets that form the segment 23 (the stator core 22) are laminated is referred to as "lamination direction." The direction in which the electrical steel sheets are laminated in the rotor core 14 coincides with the lamination direction.

Figure 6:
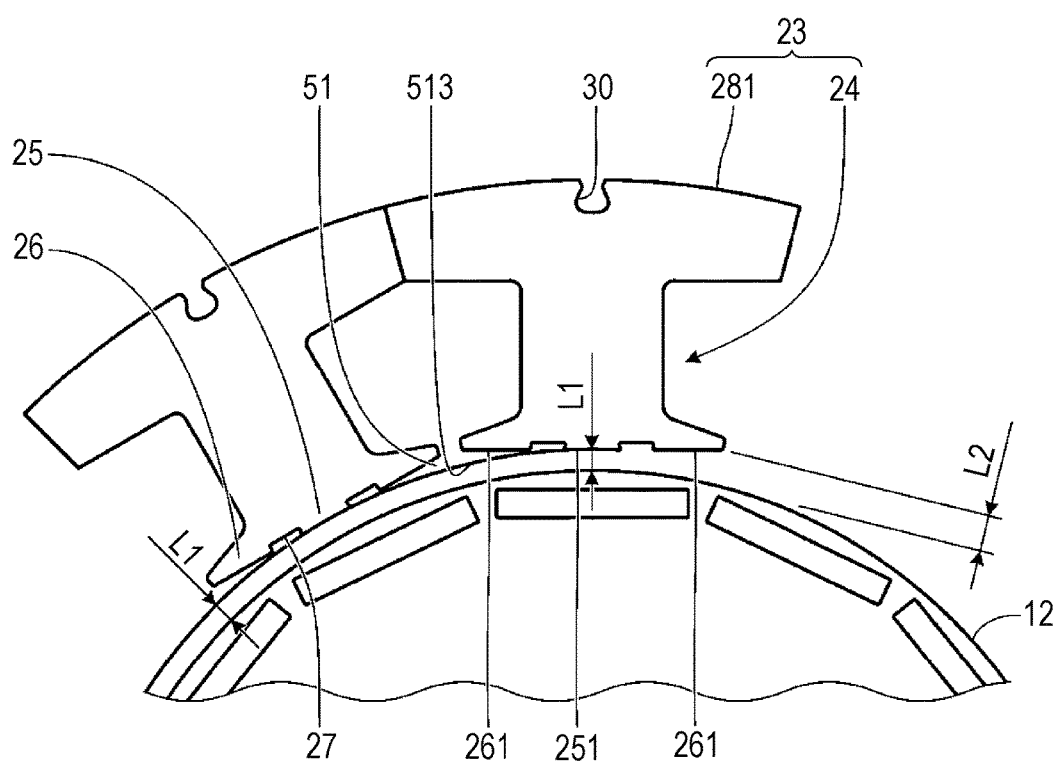
FIG. 6 is a diagram describing an air gap between a rotor and a stator.

As illustrated in FIGS. 4 and 5, the tooth portion 24 includes a first facing portion 25 and second facing portions 26. The first facing portion 25 includes the first facing surface 251 with a predetermined curvature radius. As illustrated in FIG. 6, the first facing surface 251 is the surface which faces the rotor 12 and where an air gap with the rotor 12 becomes a distance L1. The second facing portions 26 are provided at both sides of the first facing portion 25 in the circumferential direction, and are integrated with the first facing portion 25. The second facing portion 26 includes the second facing surface 261. The second facing surface 261 is the surface where an air gap becomes a distance L2 wider than the distance L1 (the distance L2>the distance L1). Specifically, the second facing surface 261 is, as illustrated in FIG. 6, the surface separated from the rotor 12 in the radial direction toward the side of the end portion of the tooth portion 24 in the circumferential direction and the surface where the air gap becomes the distance L2. The distance L2 is a distance that gradually increases toward the side of the end portion of the tooth portion 24 in the circumferential direction and is in a predetermined range (see FIG. 6). The air gap with the rotor 12 is, for example, also referred to as the interval with reference to the outermost diameter portion on the outer peripheral side surface of the rotor 12. In FIG. 6, the dimension line indicating the distance L2 is illustrated at the position where the distance L2 in the predetermined range as described previously becomes the maximum. In FIG. 6, the illustrations of the coil 40, a second mold portion 52 and a fourth mold portion 54 described later, and the like are omitted, and the illustration of a first mold portion 51 described later is omitted on the side of the second facing surface 261 where the dimension line indicating the distance L2 is illustrated.

In the tooth portion 24, the respective second facing portions 26 include groove portions 27 on the second facing surfaces 261 as illustrated in FIGS. 4 and 5. The groove portion 27 is a depressed portion that has a predetermined width in the circumferential direction and extends in the lamination direction. The groove portion 27 may have a shape inclined with respect to the center line (see the "one dot chain line" illustrated in FIG. 5) of the tooth portion 24. For example, each groove portion 27 has a shape inclined toward the side of the center line as illustrated in FIG. 5. The groove portion 27 is provided starting from, for example, the boundary position where the first facing surface 251 and the second facing surface 261 are adjacent to each other in the circumferential direction.

As illustrated in FIGS. 4 and 5, the cutout portion 30 is provided on the surface of the yoke part 281 to be the outer peripheral side surface of the segment 23. The surface of the yoke part 281 is the surface of the yoke portion 28 to be the outer peripheral side surface of the stator core 22, and is the surface at the opposite side in the radial direction to the side where the tooth portion 24 is formed. The cutout portion 30 is provided in the state extending in the lamination direction at the position (see the "one dot chain line" illustrated in FIG. 5) that coincides with the center position of the tooth portion 24 in the circumferential direction on the surface of the yoke part 281. A narrowed portion 34 is formed in the cutout portion 30. The narrowed portion 34 is a portion narrowed in the circumferential direction (see FIG. 5).

The coil 40 is formed by concentratedly winding a conducting wire around the tooth portion 24. A predetermined winding machine is used for forming the coil 40. The formation (winding) of the coil 40 by the winding machine is performed by winding the conducting wire around the tooth portion 24 of the segment 23 while each segment 23 before being formed in a ring shape is targeted. At the time of winding the wire, an insulator 44 is mounted on the segment 23 (see FIG. 1 and the like). By the insulator 44, the insulation between the segment 23 (the stator core 22) and the coil 40 can be ensured.

Figure 7:
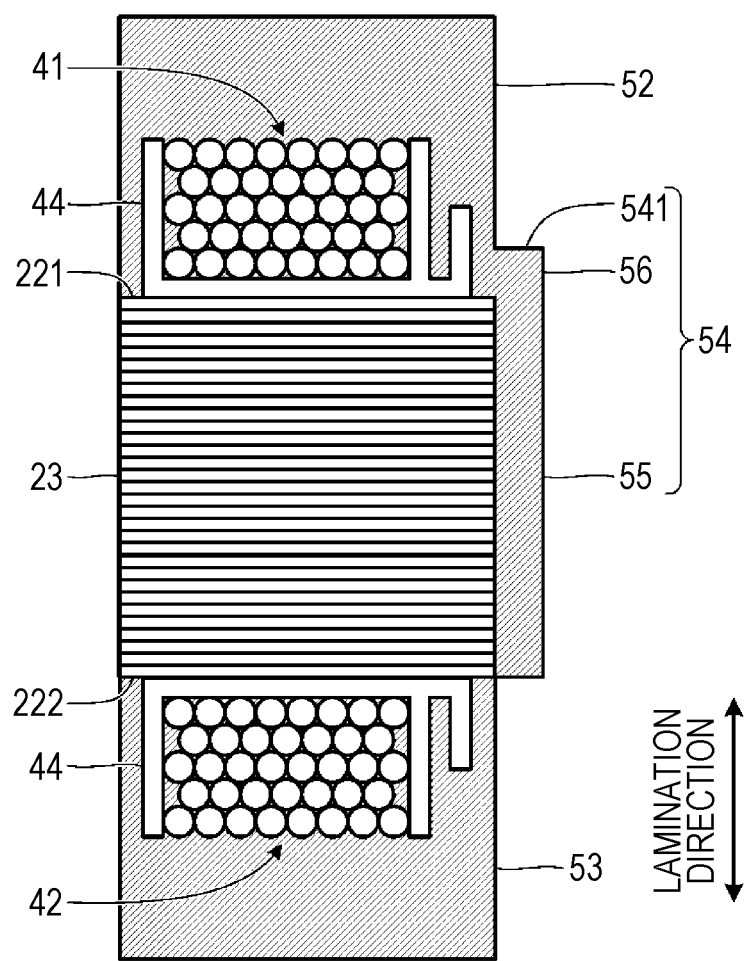
FIG. 7 is an end view taken along the line A-A illustrated in FIG. 3.

The coil 40 formed by concentratedly winding the conducting wire around the tooth portion 24 includes a first coil end portion 41 and a second coil end portion 42. The first coil end portion 41 is, as illustrated in FIG. 7, a portion of the coil 40 arranged at the side of a first end surface 221 in the stator core 22 (the segment 23). The second coil end portion 42 is, as illustrated in FIG. 7, a portion of the coil 40 arranged at the side of a second end surface 222 in the stator core 22 (the segment 23). The coil 40 includes the portions of the coil 40 that are arranged along the lamination direction at both sides of the tooth portion 24 in the circumferential direction and are housed in the respective slot portions 29 formed at both sides. The conducting wire portion that forms the first coil end portion 41 and the conducting wire portion that forms the second coil end portion 42 are joined and continuous with each other by the conducting wire portions that form the portions of the coils 40 housed in the respective slot portions 29. In FIG. 7, the illustrations of the segment 23 (the number of laminations of the electrical steel sheets and the like), the first coil end portion 41, the second coil end portion 42, the insulator 44, and the like are simplified. The same applies to FIG. 9.

Twelve coils 40 included in the stator 20 are respectively categorized into any of U-phase, V-phase, and W-phase coils 40. The 12 coils 40 are, for example, star-connected. Out of the 12 coils 40, four predetermined coils 40 form a U-phase coupling coil, other four coils 40 form a V-phase coupling coil, and still other four coils 40 form a W-phase coupling coil. The U-phase coupling coil, which is formed by coupling the U-phase coils 40, is coupled to the terminal 46U. The V-phase coupling coil, which is formed by coupling the V-phase coils 40, is coupled to the terminal 46V. The W-phase coupling coil, which is formed by coupling the W-phase coils 40, is coupled to the terminal 46W. The wire connection of the coils 40 may be wire connection different from the star connection. This may be, for example, delta connection.

As the technique for forming the stator core 22 by the plurality of divided segments 23 and the technique for forming the coils 40 in the tooth portion 24 for wire connection, the techniques that have already been put to practical use can be employed. Therefore, other descriptions related to these are omitted.

The mold portion 50 is formed by resin molding. In the state where the mold portion 50 is formed, the stator 20 is in the state where a part of the outer peripheral portion including the outer peripheral side surface of the stator core 22 is exposed (see FIG. 3). As the resin forming the mold portion 50, thermosetting resin is exemplified. For example, the mold portion 50 is formed by Bulk Molding Compound (BMC). Resin molding is performed by setting the 12 segments 23, where the coils 40 are formed regarding all the segments 23 as the target and are then formed in a ring shape, and further the wire connection of the coils 40 and the like are completed, to a molding die provided in a molding machine for resin molding.

As illustrated in FIG. 3, the mold portion 50 includes the first mold portion 51, the second mold portion 52, a third mold portion 53, and the fourth mold portion 54. The resin forming the mold portion 50 is also filled in the slot portion 29 where the coils 40 are housed, and ensures the insulation of the respective coils 40 concentratedly wound around the adjacent tooth portions 24 housed in the same slot portion 29. The mold portion 50 that includes these respective portions is integrally formed by resin molding. The mold portion 50 becomes in a state of being in close contact with a predetermined surface of the stator core 22 (the segment 23) by the injection pressure at the time of resin molding, and is engaged.

As illustrated in FIG. 6, the first mold portion 51 covers the second facing portion 26 (also see the state where the "second facing portion 26" is not illustrated in FIG. 3). A part of the first mold portion 51 is provided at the groove portion 27. Specifically, the resin forming the first mold portion 51 is also filled in the groove portion 27. The portion of the first mold portion 51 by the resin filled in the groove portion 27 is brought into close contact with and engaged with the groove portion 27. As described above, in the case where the groove portion 27 has a shape inclined with respect to the center line (see the "one dot chain line" illustrated in FIG. 5) of the tooth portion 24, the portion of the first mold portion 51 filled in the groove portion 27 gets stuck with the groove portion 27, by which the movement of the first mold portion 51 in the radial direction is restricted. The first mold portion 51 includes a third facing surface 513 that faces the rotor 12. The third facing surface 513 is a surface with the same curvature radius as that of the first facing surface 251. The air gap between the rotor 12 and the first mold portion 51 (the third facing surface 513) becomes the distance L1 similarly to the case of the first facing portion 25 (the first facing surface 251) (see FIG. 6).

As illustrated in FIG. 7, the second mold portion 52 is provided at the side of the first end surface 221 of the stator core 22 in the lamination direction, and covers the first coil end portion 41 of the coil 40 at the side of the first end surface 221. As illustrated in FIG. 7, the third mold portion 53 is provided at the side of the second end surface 222 of the stator core 22 in the lamination direction, and covers the second coil end portion 42 of the coil 40 at the side of the second end surface 222. The first mold portion 51 and the second mold portion 52 are integrated with each other at the side of the first end surface 221 of the stator core 22 in the lamination direction, and the first mold portion 51 and the third mold portion 53 are integrated with each other at the side of the second end surface 222 of the stator core 22 in the lamination direction (see the "inner peripheral side surface of the stator 20" illustrated in FIG. 3).

The fourth mold portion 54 is provided in the cutout portion 30. Specifically, the fourth mold portion 54 is formed by the resin filled in an internal space of the cutout portion 30 extending in the lamination direction and a space that is continuous with this internal space and is formed in the portion of the molding die to be at the side of the first end surface 221 of the stator core 22 (see FIGS. 3 and 7). A filling portion 55 of the fourth mold portion 54 formed by the resin filled in the internal space of the cutout portion 30 is brought into close contact with and engaged with the cutout portion 30. The fourth mold portion 54 gets stuck with the narrowed portion 34 in the filling portion 55, by which the movement in the radial direction is restricted. The fourth mold portion 54 includes a first coupling portion 56 that is integrated with the filling portion 55. The first coupling portion 56 projects at the side of the first end surface 221 of the stator core 22 in the lamination direction, and is joined to the second mold portion 52. The fourth mold portion 54 is integrated with the second mold portion 52 by the first coupling portion 56 at the side of the first end surface 221 of the stator core 22. The fourth mold portion 54 includes a first planar surface 541. The first planar surface 541 is an end surface in the lamination direction forming the first coupling portion 56, and is a surface parallel to the second end surface 222 of the stator core 22. In the example illustrated in FIG. 3, the fourth mold portion 54 is in a state of not projecting at the side of the second end surface 222 of the stator core 22. For example, the end surface of the fourth mold portion 54 at the side opposite to the first planar surface 541 in the lamination direction is a planar surface that coincides with the second end surface 222.

The fourth mold portion 54 may be provided corresponding to all the cutout portions 30, or may be omitted regarding a part of, for example, one of the cutout portions 30 to be in the state where one of the cutout portions 30 is exposed (see FIG. 3). When the rotary machine 10 is mounted at the time of assembly of the product including the rotary machine 10, the exposed cutout portion 30 where the fourth mold portion 54 is not provided can be used as the reference in the circumferential direction.

<Advantageous Effects of Embodiment>

According to the present embodiment, the following advantageous effects can be obtained.

(1) The groove portion 27 is provided at the second facing portion 26 of the tooth portion 24, and a part of the first mold portion 51 is provided at the groove portion 27 (see FIG. 6). Accordingly, it is possible to increase the thickness of the first mold portion 51 covering the second facing portion 26 in the radial direction and improve its strength. In the rotary machine 10, it is possible to inhibit the resin forming the first mold portion 51 from dropping off. It is possible to improve the reliability of the rotary machine 10.

In the case where the third facing surface 513 of the first mold portion 51 has the same curvature radius as that of the first facing surface 251 of the first facing portion 25, the molding die for resin molding to form the mold portion 50 includes an inner core having the shape corresponding to the curvature radius of the first facing surface 251. In this case, the clearance between the second facing surface 261 and the inner core gradationally narrows toward the boundary position where the first facing surface 251 and the second facing surface 261 are adjacent to each other in the circumferential direction, and the thickness of the covering portion formed by resin molding also becomes extremely thin. In this respect, as described above, when the groove portion 27 is provided starting from the boundary position where the first facing surface 251 and the second facing surface 261 are adjacent to each other in the circumferential direction, it is possible to increase the thickness of this portion.

At the time of resin molding of the mold portion 50, the first mold portion 51 can be engaged with the groove portion 27 by filling the groove portion 27 with the resin forming the first mold portion 51 and providing the portion of the first mold portion 51 formed by the filled resin to the groove portion 27 in a close contact state. Accordingly, it is possible to support the first mold portion 51 by the groove portion 27, and inhibit the resin forming the first mold portion 51 from dropping off.

The first mold portion 51 is formed integrally with the second mold portion 52 and the third mold portion 53 (see FIG. 3). Accordingly, the first mold portion 51 is supported by the second mold portion 52 and the third mold portion 53, and it is possible to inhibit the resin forming the first mold portion 51 from dropping off.

(2) The mold portion 50 includes the fourth mold portion 54 that includes the first planar surface 541 parallel to the second end surface 222 of the stator core 22 (see FIGS. 3 and 7). The first planar surface 541 is provided at the side of the first end surface 221 of the stator core 22. Accordingly, it is possible to provide the first planar surface 541 parallel to the second end surface 222 at the position separated from the second end surface 222 of the stator core 22 as the reference by the predetermined amount in the lamination direction. In the stator core 22 formed by the segments 23 with the structure where the steel sheets are laminated, variation in the dimension in the lamination direction, that is, variation in the thickness of the stator core 22 (the segment 23) may arise.

Mounting of the rotary machine 10 on a predetermined product including an electric vehicle may be performed by, for example, clamping of the stator core 22. For example, in the case where the product with such a structure is manufactured in large quantities, it is desired that the clamped portion in each rotary machine 10 has a constant dimension. In the case where the thickness of the stator core 22 is not constant, it is necessary to have a structure for clamping to deal with the variation in thickness. It is possible to provide the first planar surface 541 with reference to the second end surface 222 by the fourth mold portion 54, so that the rotary machine 10 can be mounted on the predetermined product via the first planar surface 541 and the second end surface 222. Accordingly, it is possible to simplify the structure for clamping in the product that includes the rotary machine 10. Mounting of the rotary machine 10 in the predetermined product is performed by, for example, clamping of the first planar surface 541 and the second end surface 222.

The fourth mold portion 54 is formed integrally with the second mold portion 52 (see FIG. 3). Accordingly, the fourth mold portion 54 is supported by the second mold portion 52, and it is possible to inhibit the resin forming the fourth mold portion 54 from dropping off. The cutout portion 30 where the narrowed portion 34 is formed is provided on the surface of the yoke portion 28 serving as the outer peripheral side surface of the stator core 22 (see FIGS. 4 and 5 and the like), and the fourth mold portion 54 is engaged with the cutout portion 30. Accordingly, the fourth mold portion 54 is supported by the cutout portion 30, and it is possible to inhibit the resin forming the fourth mold portion 54 from dropping off.

<Modifications>

The present embodiment can also be configured as follows. The modifications described below may be appropriately employed in combination with another modification. Even in the case where the following configurations are employed, the same advantageous effects as the above-described advantageous effects can be obtained.

(1) In the above description, the rotary machine 10 where the number of poles of the rotor 12 is 14 and the number of slots of the stator 20 is 12 has been described as an example (see FIG. 1). The number of poles of the rotor and/or the number of slots of the stator may be different from these. The number of poles of the rotor and/or the number of slots of the stator are appropriately set taking into consideration various conditions such as a required performance. The rotor may be a rotor of a type where a permanent magnet is provided on the outer peripheral side surface of the rotor core, or may be a rotor of a type where the permanent magnet is not included. In the case where the rotary machine is a motor, the motor that includes a rotor where a permanent magnet is provided on the outer peripheral side surface of a rotor core is called a Surface Permanent Magnet (SPM) motor.

The stator 20, in which the stator core 22 is formed by arranging the segments 23 in a ring shape and the coils 40 are wound around the tooth portion 24 through concentrated winding, has been described as an example (see FIGS. 1, 4 and 5). The stator core may be an integrated-type stator core. The segment may include a tooth portion where the second facing portion 26 is provided at any one side (the backward side or the forward side of the rotation direction) in the circumferential direction. Regarding the air gap in the second facing surface 261 (see FIG. 6), the distance L2 may be a constant distance. In this case, the second facing surface becomes a surface with a curvature radius larger than curvature radius of the first facing surface 251. To inhibit a rapid change of the air gap, the boundary position (range) where the first facing surface 251 and the second facing surface are adjacent to each other in the circumferential direction may be inclined. Also, the stator may include a coil formed by winding wire with a method different from concentrated winding. For example, the stator may include a coil formed by distributed winding or full-pitch winding.

Figure 8:
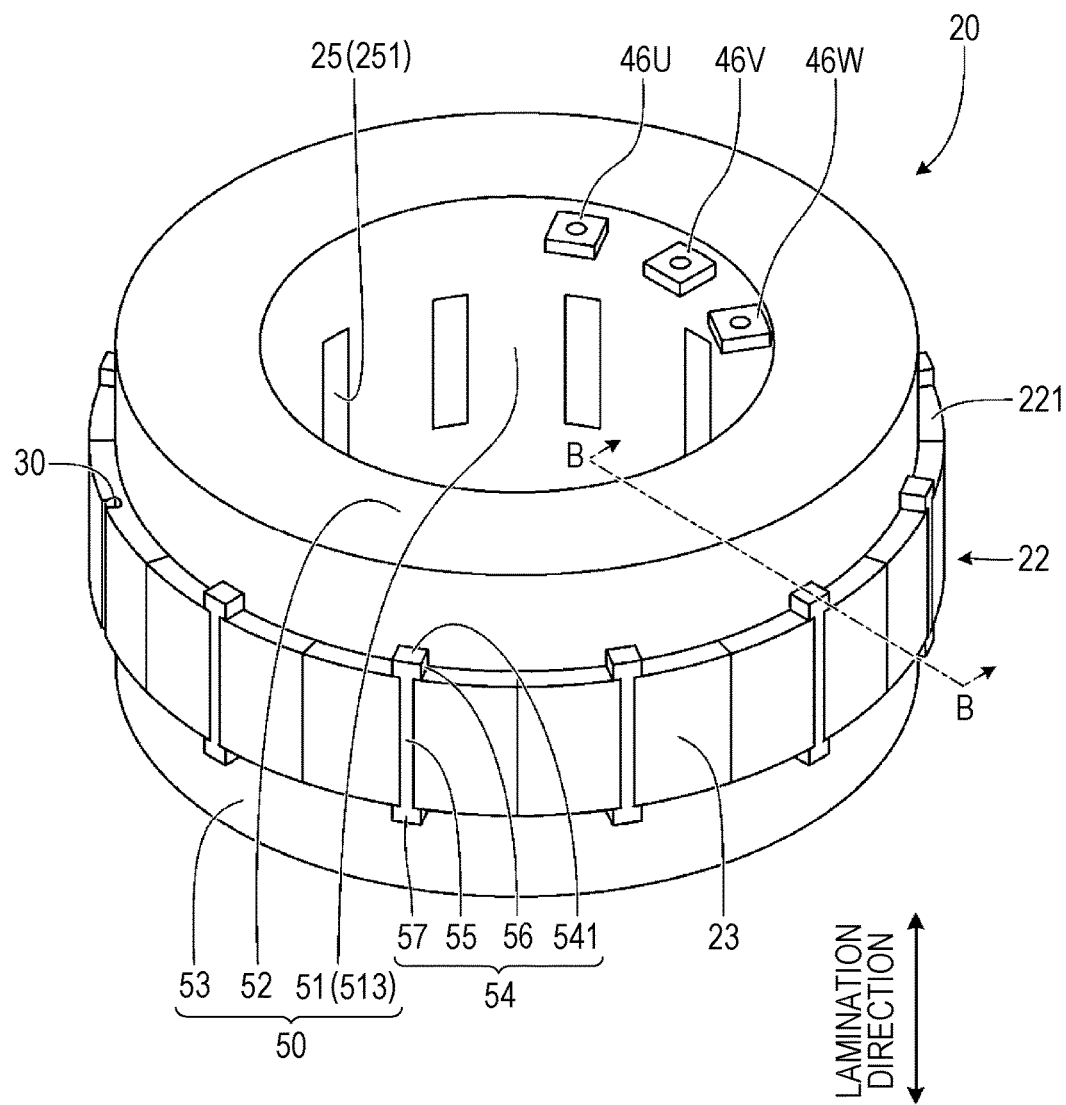
FIG. 8 is a perspective view illustrating one example of a stator where a fourth mold portion of a mold portion includes a first planar surface and a second planar surface.
Figure 9:
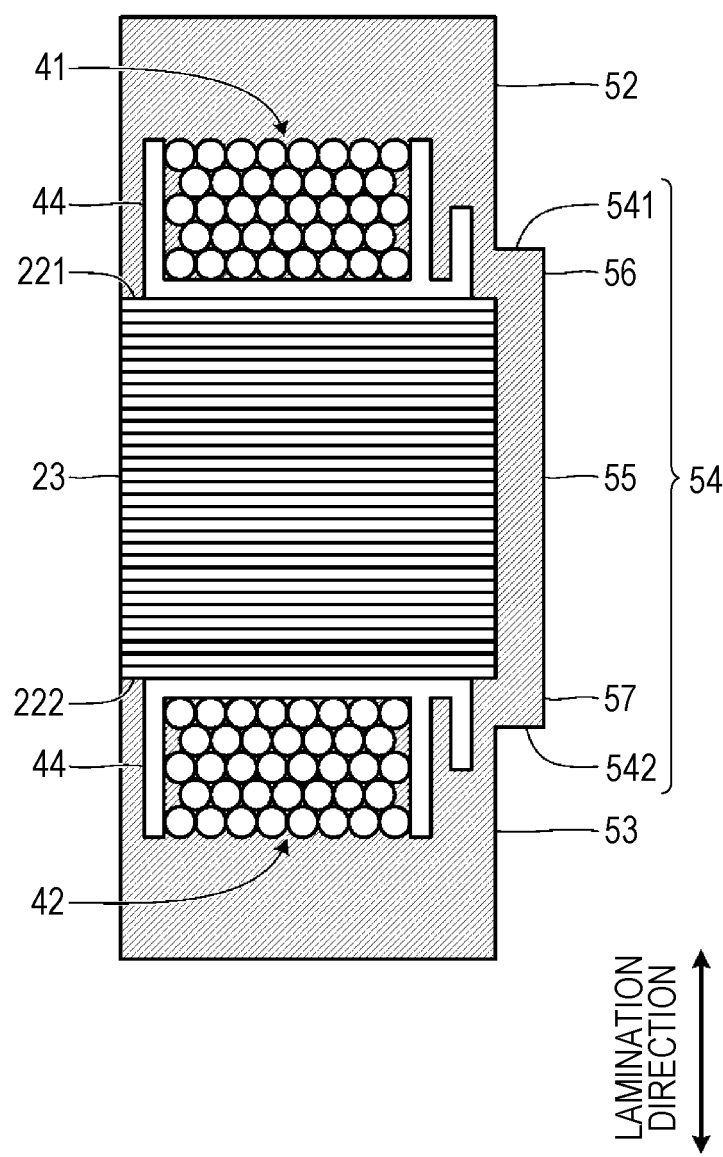
FIG. 9 is an end view taken along the line B-B illustrated in FIG. 8.

(2) In the above description, the fourth mold portion 54 that includes the first planar surface 541 has been described as an example (see FIGS. 3 and 7). Additionally, the fourth mold portion 54 may include a second planar surface 542 in addition to the first planar surface 541. In this case, the fourth mold portion 54 includes a second coupling portion 57 as illustrated in FIGS. 8 and 9. The second coupling portion 57 projects at the side of the second end surface 222 of the stator core 22 in the lamination direction, and is joined to the third mold portion 53. The fourth mold portion 54 is integrated with the third mold portion 53 by the second coupling portion 57 at the side of the second end surface 222 of the stator core 22. The second planar surface 542 is an end surface in the lamination direction forming the second coupling portion 57, and is the surface parallel to the second end surface 222 of the stator core 22. The second planar surface 542 is formed at the side opposite to the first planar surface 541 in the lamination direction.

The first planar surface 541 and the second planar surface 542 are separated from each other by the distance obtained by adding the projection amount of the first coupling portion 56 from the first end surface 221 and the projection amount of the second coupling portion 57 from the second end surface 222 to the thickness of the segment 23 in the lamination direction. The fourth mold portion 54 that includes the first coupling portion 56 and the second coupling portion 57 is formed by resin molding. Accordingly, the separation distance between the first planar surface 541 and the second planar surface 542 in the lamination direction becomes the same in all the segments 23 forming the stator core 22.

Also with such a configuration, it is possible to mount the rotary machine 10 on a predetermined product via the first planar surface 541 and the second planar surface 542 that are parallel to each other and separated from each other by a predetermined amount in the lamination direction. Mounting of the rotary machine 10 on the predetermined product is performed by, for example, clamping of the first planar surface 541 and the second planar surface 542. The fourth mold portion 54 is supported by the second mold portion 52 and the third mold portion 53, and it is possible to inhibit the resin forming the fourth mold portion 54 from dropping off. The stator 20 illustrated in FIG. 8 is different from the stator 20 described based on FIGS. 3 and 7 and the like in the point related to the second coupling portion 57 where the second planar surface 542 is formed as described above, and the other points are the same. Therefore, other descriptions related to the stator 20 illustrated in FIG. 8 are omitted.

Figure 10:
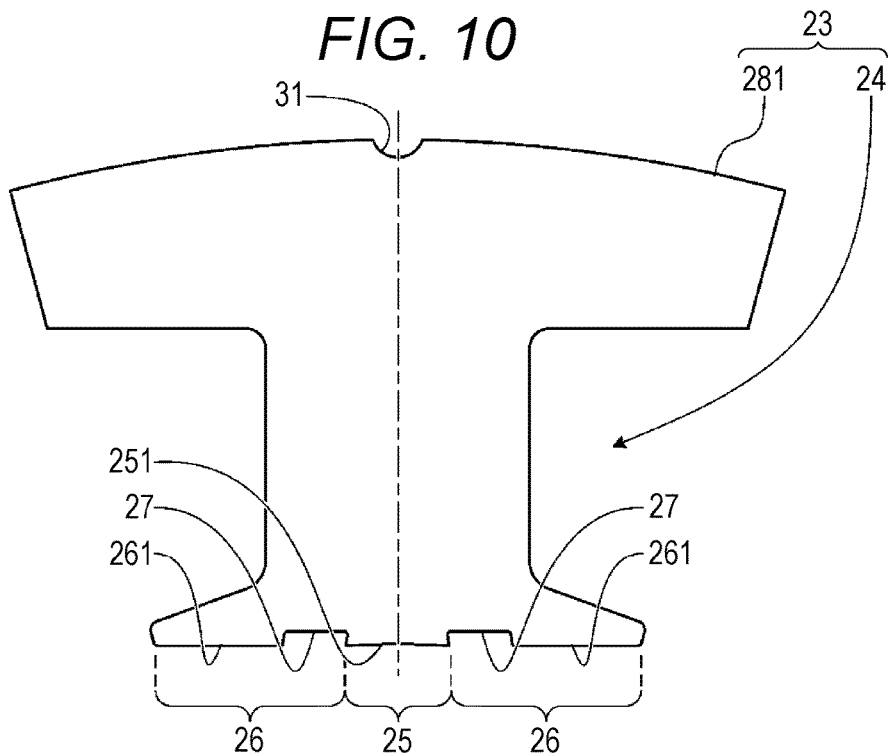
FIG. 10 is a plan view illustrating another example of the stator core segment, and illustrates the stator core segment that includes an arc-shaped cutout portion.
Figure 11:
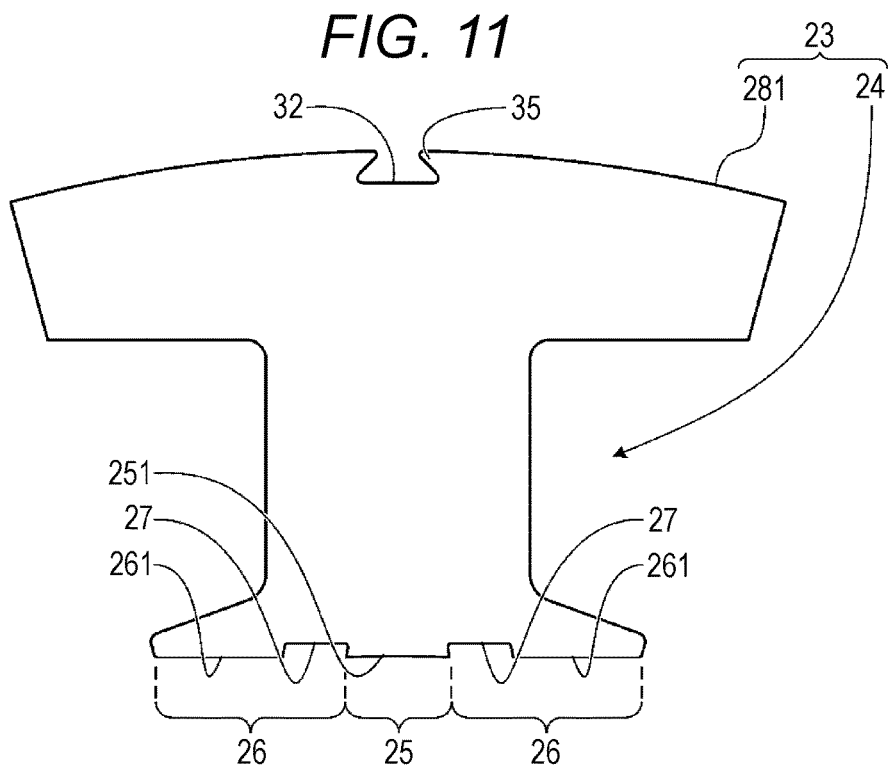
FIG. 11 is a plan view illustrating still another example of the stator core segment, and illustrates the stator core segment that includes a trapezoidal-shaped cutout portion.

(3) In the above description, the cutout portion 30 having the shape as illustrated in FIGS. 4 and 5 has been described as an example. The shape of the cutout portion 30 may be a shape different from this. For example, an arc-shaped cutout portion 31 as illustrated in FIG. 10 may be employed. In the arc-shaped cutout portion 31, the narrowed portion 34 as provided in the cutout portion 30 is omitted. Alternatively, a trapezoidal-shaped cutout portion 32 as illustrated in FIG. 11 may be employed. According to the trapezoidal-shaped cutout portion 32, similarly to the narrowed portion 34 of the cutout portion 30, the fourth mold portion 54 is in the state where the movement in the circumferential direction is restricted by corner portions 35.

(4) In the above description, the fourth mold portion 54 where the first coupling portion 56 is discontinuous in the circumferential direction in the outer peripheral side portion of the first end surface 221 of the stator core 22 has been described as an example (see FIG. 3). The fourth mold portion 54 may be configured such that the first coupling portion 56 becomes in a ring shape (see FIG. 12) or an arc shape (see FIG. 13) integrated in the circumferential direction and such that the plurality of filling portions 55 and the ring-shaped or arc-shaped first coupling portion 56 are integrated with each other. The ring-shaped or arc-shaped first coupling portion 56 covers a predetermined range of the outer peripheral side portion of the first end surface 221 of the stator core 22. For example, in the case where the first coupling portion 56 is in a ring shape, the outer peripheral side portion of the first end surface 221 is covered by the ring-shaped first coupling portion 56 over the whole circumference (see FIG. 12). The fourth mold portion 54 is integrated with the second mold portion 52 by the ring-shaped or arc-shaped first coupling portion 56 at the side of the first end surface 221 of the stator core 22. In the case where the first coupling portion 56 is in a ring shape, the first planar surface 541 also becomes in a ring shape corresponding to the ring-shaped first coupling portion 56 (see FIG. 12). In the case where the first coupling portion 56 is in an arc shape, the first planar surface 541 also becomes in an arc shape corresponding to the arc-shaped first coupling portion 56 (see FIG. 13).

Figure 12:
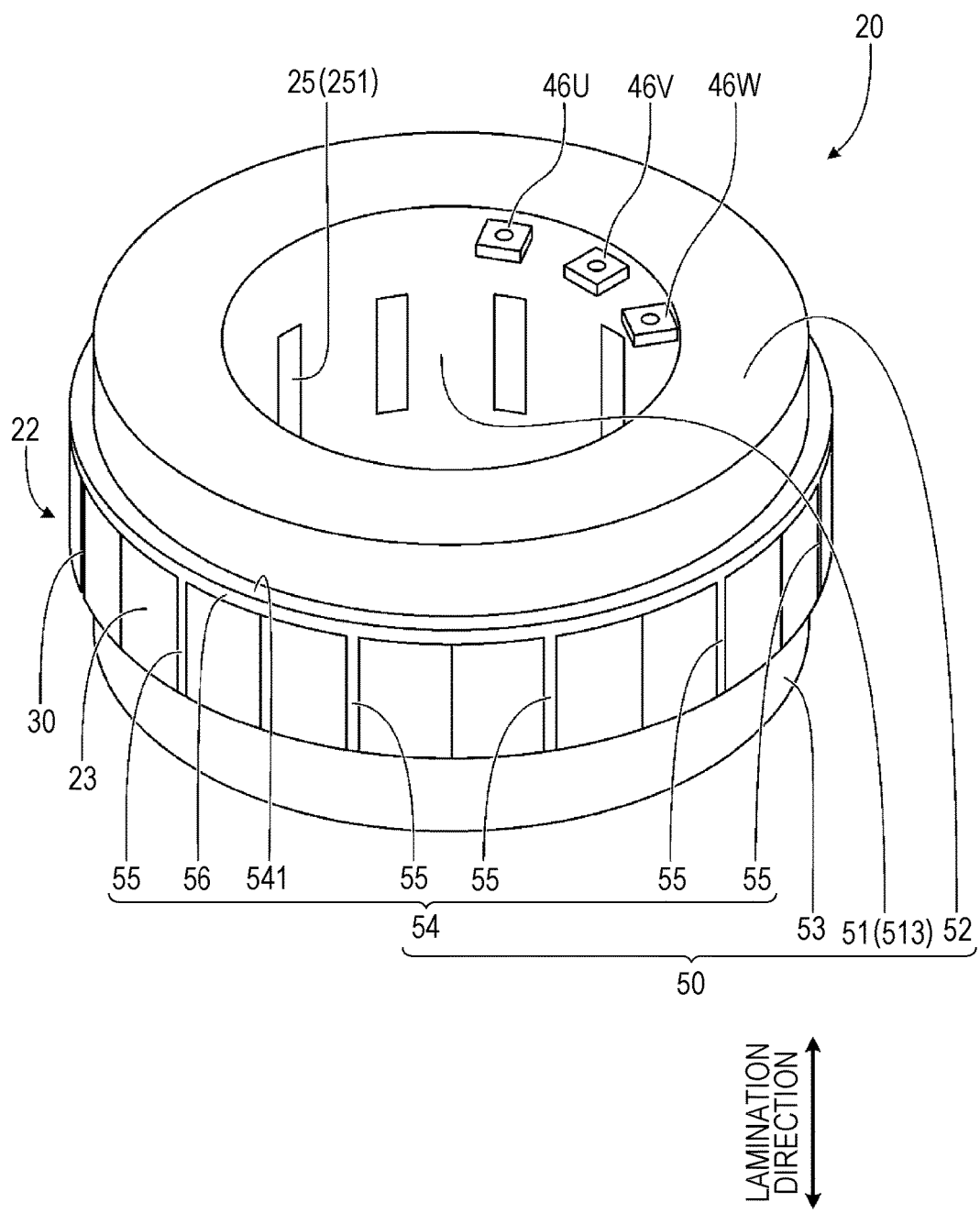
FIG. 12 is a perspective view illustrating another example of the resin-molded stator, and illustrates one example of the case where a first coupling portion of the fourth mold portion is in a ring shape.
Figure 13:
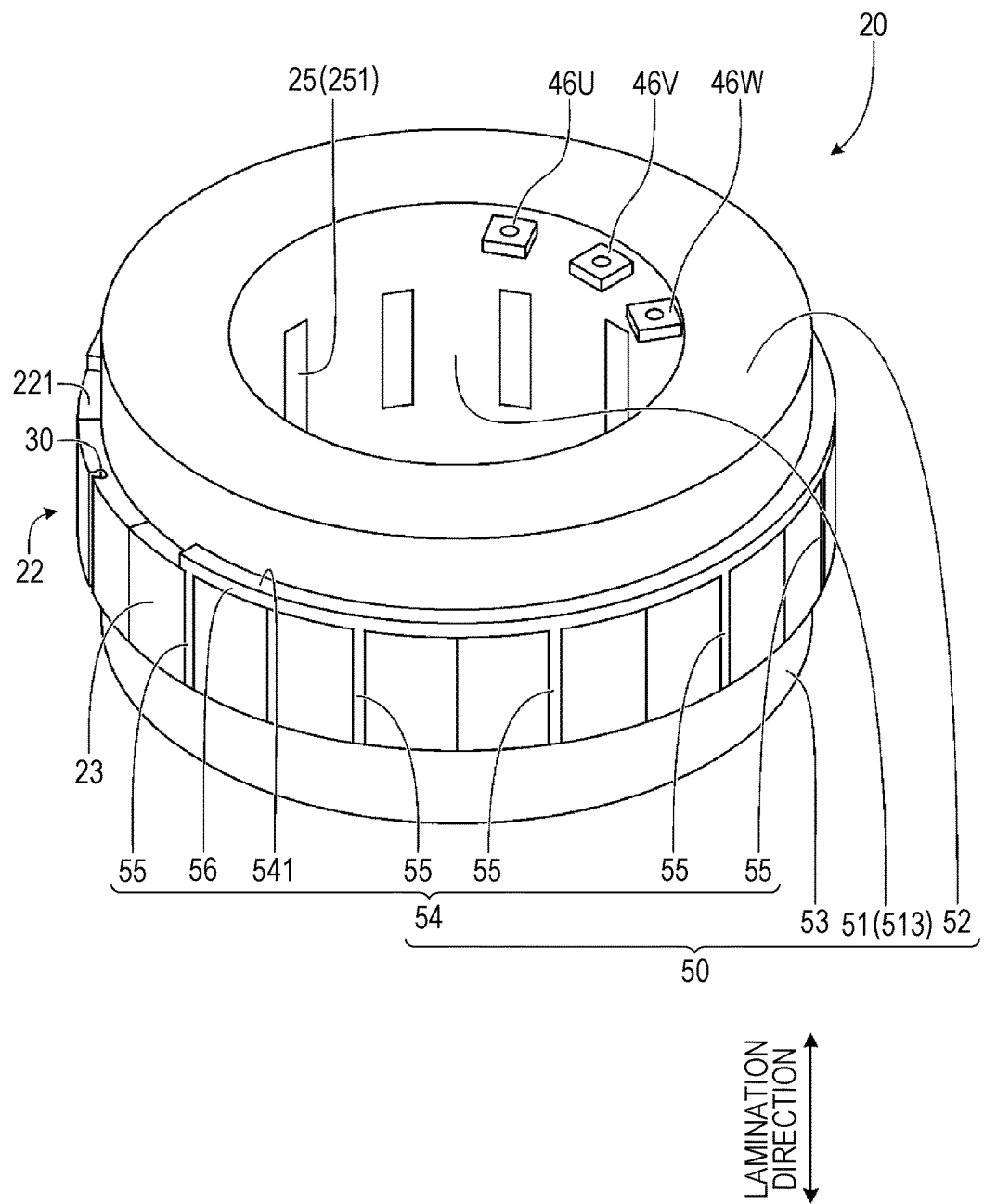
FIG. 13 is a perspective view illustrating still another example of the resin-molded stator, and illustrates one example of the case where the first coupling portion of the fourth mold portion is in an arc shape.

In the case where the first coupling portion 56 is in an arc shape while a part of the cutout portions 30 is exposed, the first coupling portion 56 may be configured to be in an arc shape where the range corresponding to the exposed cutout portion 30 is opened. The fourth mold portion 54 illustrated in FIG. 13 is an exemplified case where one of the cutout portions 30 is exposed. The first coupling portion 56 is in an arc shape (C shape) where the range corresponding to the exposed cutout portion 30 is opened. In the outer peripheral side portion of the first end surface 221 of the stator core 22, the range corresponding to the exposed cutout portion 30 is exposed. The stators 20 illustrated in FIGS. 12 and 13 are different from the stator 20 described based on FIG. 3 and the like in the point related to the first coupling portion 56 described above, and the other points are the same. Therefore, other descriptions related to the stators 20 illustrated in FIGS. 12 and 13 are omitted. The second coupling portion 57 (see FIGS. 8 and 9) described above may also be in a ring shape or an arc shape, similarly to the first coupling portion 56.

The mold portion 50 that includes the fourth mold portion 54 has been described as an example (see FIG. 3). A stator may include a mold portion where the fourth mold portion 54 is omitted, and a rotary machine may include such a stator. Additionally, the mold portion 50 that includes the first mold portion 51 has been described as an example (see FIG. 3). A stator may include a mold portion where the first mold portion 51 is omitted, and a rotary machine may include such a stator.

(5) In the above description, the rotary machine 10 of the inner rotation type where the rotor 12 is rotatably supported at the inner peripheral side of the stator 20 has been described as an example (see FIG. 1). The rotary machine may be a rotary machine of an outer rotation type. In the stator of the rotary machine of the outer rotation type, a plurality of tooth portions projects outward in the radial direction from the yoke portion. The rotor of the rotary machine of the outer rotation type faces the plurality of tooth portions at the outer side of the stator. The respective portions facing the rotor in the tooth portions are formed similarly to the above description (see FIGS. 4 and 5), and the portion (the surface corresponding to the second facing surface 261) corresponding to the second facing portion 26 is covered by a covering portion corresponding to the first mold portion 51. On the inner peripheral side surface of the stator, the same cutout portion as the cutout portions 30, 31, and 32, which are provided on the outer peripheral side surface of the stator 20 described above, is formed (see FIGS. 4 and 5, or FIGS. 10 and 11). The configuration corresponding to the fourth mold portion 54 is engaged with this cutout portion. Accordingly, the present embodiment is also applicable to the rotary machine of the outer rotation type, similarly to the above description. The description related to the rotary machine of the outer rotation type to which the present embodiment is applied is omitted.

DESCRIPTION OF REFERENCE SIGNS

10: Rotary machine
12: Rotor
14: Rotor core
16: Permanent magnet
18: Shaft
20: Stator
22: Stator core
23: Stator core segment (segment)
24: Tooth portion
25: First facing portion
26: Second facing portion
27: Groove portion
28: Yoke portion
29: Slot portion
30, 31, 32: Cutout portion
34: Narrowed portion
35: Corner portion
40: Coil
41: First coil end portion
42: Second coil end portion
44: Insulator
46U, 46V, 46W: Terminal
50: Mold portion
51: First mold portion
52: Second mold portion
53: Third mold portion
54: Fourth mold portion
55: Filling portion
56: First coupling portion
57: Second coupling portion
221: First end surface
222: Second end surface
251: First facing surface
261: Second facing surface
281: Yoke part
513: Third facing surface
541: First planar surface
542: Second planar surface
L1, L2: Distance

The invention claimed is:

1. A rotary machine, comprising:
a rotor rotatably provided; and
a resin-molded stator, wherein
the stator includes:
a stator core formed by laminating steel sheets, the stator core including a plurality of tooth portions facing the rotor and a yoke portion;
a coil housed in a slot portion formed between the adjacent tooth portions; and
a mold portion formed by resin molding,
the tooth portion includes:
a first facing portion that includes a first facing surface where an air gap with the rotor becomes a first distance; and
a second facing portion integrated with the first facing portion in a circumferential direction centered at a rotation axis of the rotor, the second facing portion including a second facing surface where the air gap becomes a second distance wider than the first distance,
the second facing portion includes, on the second facing surface, a groove portion extending in a lamination direction where the steel sheets are laminated,
the mold portion includes a first mold portion that covers the second facing portion and is provided at the groove portion, and
the first mold portion includes a third facing surface where the air gap becomes the first distance.

2. The rotary machine according to claim 1, wherein the first mold portion is engaged with the groove portion.

3. The rotary machine according to claim 1, wherein the mold portion includes:
a second mold portion provided at a side of a first end surface of the stator core in the lamination direction, the second mold portion covering a first coil end portion of the coil at the side of the first end surface; and
a third mold portion provided at a side of a second end surface of the stator core in the lamination direction, the third mold portion covering a second coil end portion of the coil at the side of the second end surface, and
the first mold portion is integrated with the second mold portion and the third mold portion.

4. The rotary machine according to claim 1, wherein the mold portion includes a fourth mold portion that includes a first planar surface parallel to a second end surface of the stator core in the lamination direction, and
the first planar surface is provided at a side of a first end surface of the stator core in the lamination direction.

5. The rotary machine according to claim 4, wherein
the fourth mold portion includes a second planar surface parallel to the second end surface, the second planar surface being separated from the first planar surface by a predetermined amount in the lamination direction, and
the second planar surface is provided at a side of the second end surface in the lamination direction.

6. The rotary machine according to claim 4, wherein the mold portion includes:
   a second mold portion provided at a side of the first end surface in the lamination direction, the second mold portion covering a first coil end portion of the coil at the side of the first end surface; and
   a third mold portion provided at a side of the second end surface in the lamination direction, the third mold portion covering a second coil end portion of the coil at the side of the second end surface, and
the fourth mold portion is integrated with at least one of the second mold portion and the third mold portion.

7. The rotary machine according to claim 6, wherein the first mold portion is integrated with the second mold portion and the third mold portion.

8. The rotary machine according to claim 4, wherein the stator core includes a cutout portion extending in the lamination direction on a peripheral side surface at a side where the tooth portion is not provided in a radial direction centered at the rotation axis, and
the fourth mold portion is provided at the cutout portion.

9. An electric vehicle, comprising the rotary machine according to claim 1.

10. The rotary machine according to claim 5, wherein the stator core includes a cutout portion extending in the lamination direction on a peripheral side surface at a side where the tooth portion is not provided in a radial direction centered at the rotation axis, and
the fourth mold portion is provided at the cutout portion.

11. The rotary machine according to claim 6, wherein the stator core includes a cutout portion extending in the lamination direction on a peripheral side surface at a side where the tooth portion is not provided in a radial direction centered at the rotation axis, and
the fourth mold portion is provided at the cutout portion.

12. The rotary machine according to claim 7, wherein the stator core includes a cutout portion extending in the lamination direction on a peripheral side surface at a side where the tooth portion is not provided in a radial direction centered at the rotation axis, and
the fourth mold portion is provided at the cutout portion.

13. A rotary machine, comprising:
a rotor rotatably provided; and
a resin-molded stator, wherein
the stator includes:
   a stator core formed by laminating steel sheets, the stator core including a plurality of tooth portions facing the rotor, a yoke portion, and a cutout portion extending in a lamination direction on a peripheral side surface at a side opposite where the tooth portion is provided in a radial direction centered at a rotation axis of the rotor;
   a coil housed in a slot portion formed between the adjacent tooth portions; and
   a mold portion formed by resin molding,
the mold portion includes a fourth mold portion that includes a first planar surface parallel to a second end surface of the stator core in the lamination direction where the steel sheets are laminated, wherein the fourth mold portion is provided at the cutout portion and at a side opposite where the tooth portion is provided in the radial direction centered at the rotation axis of the rotor, and
the first planar surface is provided at a side of a first end surface of the stator core in the lamination direction and at a position projecting from the first end surface in the lamination direction.

14. The rotary machine according to claim 13, wherein the fourth mold portion includes a second planar surface parallel to the second end surface, the second planar surface being separated from the first planar surface by a predetermined amount in the lamination direction, and
the second planar surface is provided at a side of the second end surface in the lamination direction.

15. The rotary machine according to claim 13, wherein the mold portion includes:
   a second mold portion provided at a side of the first end surface in the lamination direction, the second mold portion covering a first coil end portion of the coil at the side of the first end surface; and
   a third mold portion provided at a side of the second end surface in the lamination direction, the third mold portion covering a second coil end portion of the coil at the side of the second end surface, and
the fourth mold portion is integrated with at least one of the second mold portion and the third mold portion.

16. An electric vehicle, comprising the rotary machine according to claim 13.

17. The rotary machine according to claim 14, wherein the mold portion includes:
   a second mold portion provided at a side of the first end surface in the lamination direction, the second mold portion covering a first coil end portion of the coil at the side of the first end surface; and
   a third mold portion provided at a side of the second end surface in the lamination direction, the third mold portion covering a second coil end portion of the coil at the side of the second end surface, and
the fourth mold portion is integrated with at least one of the second mold portion and the third mold portion.

* * * * *